Oct. 18, 1927.   W. H. TAPE   1,645,975
BRAKE
Filed Sept. 30, 1925

INVENTOR.
WILLIAM HENRY TAPE
BY
ATTORNEYS.

Patented Oct. 18, 1927.

1,645,975

UNITED STATES PATENT OFFICE.

WILLIAM HENRY TAPE, OF LETHBRIDGE, ALBERTA, CANADA, ASSIGNOR OF ONE-HALF TO ROBERT BARROWMAN, OF LETHBRIDGE, CANADA.

BRAKE.

Application filed September 30, 1925. Serial No. 59,511.

The present invention relates to improvements in brakes, particularly designed for motor vehicles, and its particular object is to provide a brake that is very simple in construction and very effective, allowing the driver to set the brake with a minumum of effect and furthermore being so constructed as to be easily taken apart and re-assembled for the purpose of repair.

It is particularly proposed in this present invention to utilize axially movable elements for effecting braking action and to apply a worm or thread for imparting this motion. Further features and advantages of my invention will appear as the specification proceeds.

Figure 1:
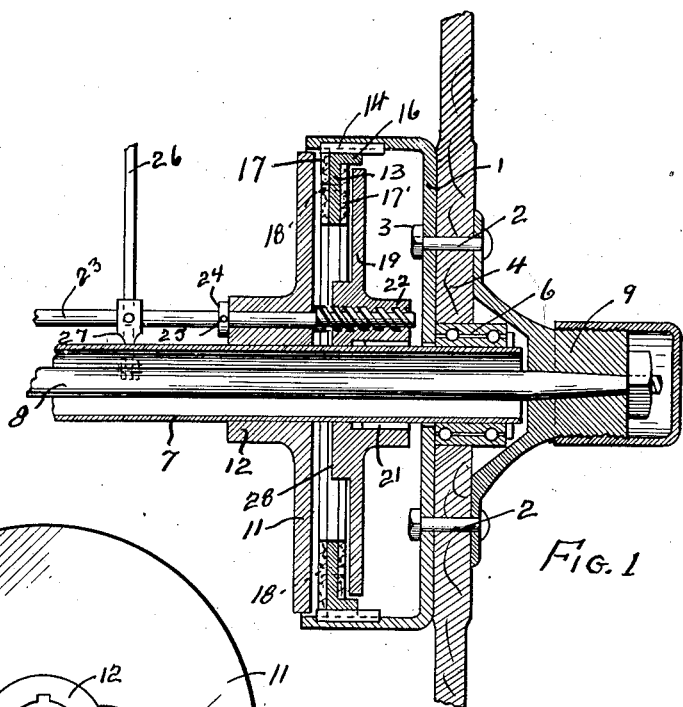
Figure 2:
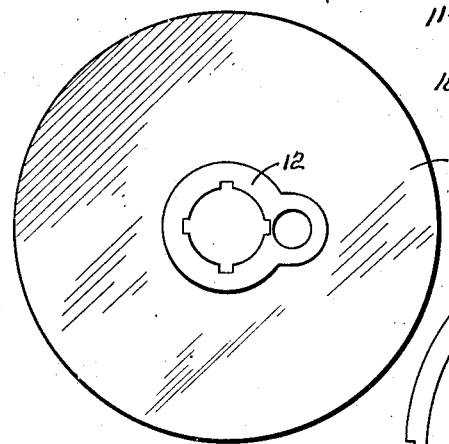

The preferred form of my invention is illustrated in the accompanying drawing in which:

Figure 1 shows an axial section through my brake mechanism,

Figure 2 a detail view of a disc element used in my brake mechanism, and

Figure 3:
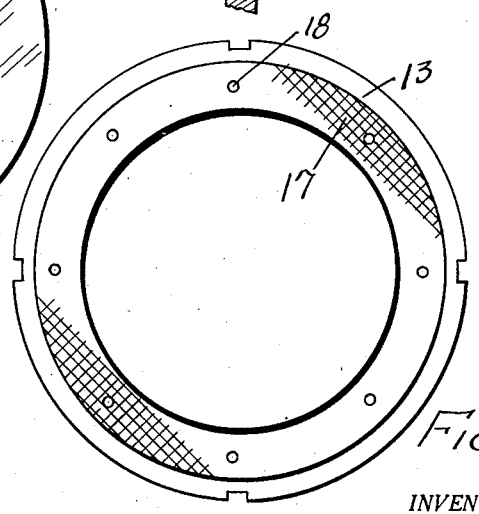

Figure 3 a detail view of a friction ring forming part of my device.

While I have shown only the preferred form of the invention it should be understood that various changes and modifications may be made within the scope of the claims hereto attached without departing from the spirit of the invention.

The brake drum 1 which may be of conventional form is secured by means of bolts 2 and nuts 3 to the wheel 4, which latter revolves through bearings 6 on the axle housing 7 and is actuated by means of the axle shaft 8 keyed to the hub 9 of the wheel.

A disc 11 provided with a hub portion 12 is fixed relative to the axle housing so as to confront the open end of the brake drum. A ring 13 is axially slidable within the brake drum and keyed to the latter as shown at 14 so as to partake of its revolving motion. The ring is provided with an inturned flange 16 and with brake lining 17 on opposite sides thereof which brake lining may be riveted to the ring as shown at 18.

A second disc 19 is slidable on the axle housing 7 and keyed thereto as shown at 21 so as to be held against rotation, the disc being formed with a substantial hub 22. A rod 23 extends transversely through the hub of the disc 11 and is threaded into the hub 22 of the disc 19, the threaded portion being larger in diameter than the plain portion of the rod 23 and extending up to the inner face of the disc 11 so as to prevent inward axial motion of the rod 23. Outward axial motion is prevented by a collar 24 secured thereto by set screw 25 and bearing on the outer face of the hub 12. The rod 23 may be operated from the driver's seat in any suitable manner as for instance by means of the longitudinal rod 26 pivotally engaging an arm 27 secured to the rod 23.

The operation of my device will be readily understood from the foregoing description. The rod 23 is held against endwise motion by the collar 24 and the threaded bearing on the hub 12 of the disc 11 from opposite sides. When the rod is revolved clockwise the disc 19 is drawn inwardly and forces the ring 13 upon the disc 11 whereby further rotation of the ring 13 and of the brake drum connected therewith is opposed.

One of the discs 11 or 19 is preferably provided with an internal hub 28 serving as a spacing member for the two discs, the hub being sufficiently heavy to prevent a closing in of the two discs on the ring 13 after the brake lining 17 is worn out.

I claim:

1. A brake mechanism comprising a vehicle wheel having a brake drum fixed relative thereto, an axle housing having a disc fixed relative thereto to confront the open end of the brake drum, a ring held to the brake drum and axially slidable therein, so as to confront the disc, a second disc held to the axle housing with freedom of axial motion and disposed on the opposite side of the ring and a rod held in the first disc against endwise motion and threaded into the second disc so as to impart endwise motion to the latter when revolved for forcing the two discs upon the ring or for releasing their hold.

2. A brake drum, as defined in claim 1, in which the two discs are provided with large hub portions and in which the rod engages the discs at the said hub portions.

3. A brake drum, as defined in claim 1, in which the ring engages the brake drum at the periphery and in which the rod engages the two discs at enlarged hub portions thereof.

4. A brake mechanism comprising a brake drum including a web and a flange, two spaced non-revolving elements axially alined therewith and mounted on the flanged side of the web, a friction member revolvable with the brake drum and extending into the space between the two non-revolving elements and a rod held against endwise motion in one of the elements and threaded into the other and allowing frictional engagement to be established between the friction member and two elements.

5. A brake mechanism as defined in claim 4 in which the two non-revolving elements are provided with large hub portions and in which the rod engages the said elements abaxially and at the hub portions.

In testimony whereof I affix my signature.

WILLIAM HENRY TAPE.